United States Patent [19]

Howland et al.

[11] Patent Number: 5,323,192
[45] Date of Patent: Jun. 21, 1994

[54] METHOD AND PACKAGING SYSTEM FOR FACILITATING FABRICATION OF LAMINATED LENSES

[75] Inventors: Mary Howland; Mark Porden, both of Petaluma, Calif.

[73] Assignee: Pilkington Visioncare, Inc., Menlo Park, Calif.

[21] Appl. No.: 793,178

[22] Filed: Nov. 18, 1991

[51] Int. Cl.$^5$ .......................... G02C 7/02; G02C 7/06
[52] U.S. Cl. .................................... 351/177; 351/159; 351/166; 351/172
[58] Field of Search ................ 351/159, 166, 172, 177

[56] References Cited

U.S. PATENT DOCUMENTS

| | | | |
|---|---|---|---|
| 3,877,798 | 4/1975 | Tolar et al. | 351/176 |
| 4,867,553 | 9/1989 | Frieder | 351/172 |
| 5,149,181 | 9/1992 | Bedford | 351/166 |

Primary Examiner—Scott J. Sugarman
Attorney, Agent, or Firm—Harris Zimmerman

[57] ABSTRACT

Fabrication of an eyeglass lens to meet a specific ophthalmic prescription is simplified by arranging back lens wafers of different sphere powers and cylinder corrections in order of the through sphere powers of the lenses that are produced by laminating each back lens wafer with front lens wafers that have the same base curve. The front lens wafers of like segment style are grouped together and include sub-groups of wafers of similar base curve which are arranged in order of add power. Each lens wafer is maintained in an individual package prior to lamination and the back wafer packages display the through sphere powers that result from laminating the wafer with different ones of the front wafers. Reference to a conventional component selection chart is unnecessary as the correct back lens wafer can be directly located from the data on the prescription and the package of the back lens wafer directs the technician to the correct front lens wafer. Verification that the correct lens wafers has been selected is provided for by a component of the front wafer package that obscures the display of through sphere powers on a back wafer package when the two packages are superimposed except for the particular through sphere power that is produced by lamination of the wafers from the two packages.

16 Claims, 4 Drawing Sheets

FIG_1

FIG_2

FIG_6

FIG_3

FIG_5A  FIG_5B

FIG_7A  FIG_7B

METHOD AND PACKAGING SYSTEM FOR FACILITATING FABRICATION OF LAMINATED LENSES

TECHNICAL FIELD

This invention relates to the fabrication of ophthalmic lenses by laminating selected lens wafers to provide lenses having prescribed optical properties. More particularly the invention relates to a method and a packaging system for simplifying such operations and for assuring that lenses have the prescribed properties.

BACKGROUND OF THE INVENTION

Ophthalmic prescriptions for eyeglass lenses use a standardized nomenclature to identify the combination of lens characteristics that are needed to correct a particular person's vision. Dispensing opticians do not stock prefabricated lenses of all possible combinations that may be needed as this would require an impractically large inventory. Thus the lenses that are specified in most prescriptions must be individually fabricated at the time that the prescription is filled.

Filling a prescription by the traditional process of grinding and polishing lens blanks is undesirably costly and time consuming. The process is particularly complicated if the prescription calls for multi-vision lenses such as bifocals or trifocals.

Fabrication of lenses by laminating lens wafers together with a light transmissive adhesive is a simpler and faster procedure for filling individual prescriptions. The optician maintains a stock of lens wafers of incrementally differing optical properties and selects a front and a back wafer which meet the lens requirements of a particular prescription when the wafers are laminated together. A limited number of back wafers of incrementally different sphere powers, for example, can be paired in different combinations with ones of a smaller number of front wafers of differing base curves to produce lenses having a large number of different through sphere powers. This makes it possible to fill most prescriptions with a wafer inventory of practical size.

In addition to a spherical correction for nearsightedness or farsightedness, a prescription may call for any of various degrees of cylinder correction for astigmatism and in the case of multi-vision lenses also specifies a degree of add power and a segment style configuration for the bifocal, trifocal or progressive insert. Thus the stocked wafers include a number of wafers of each sphere power or base curve that differ from each other in these other respects.

In the prior practice of this method of lens lamination, each wafer is individually packaged and the back wafer packages display the sphere power of the wafer itself while the front packages display the base curve of the wafer which is the nominal curvature of the convex front surface of the front wafer. This data does not enable a direct selection of the particular front wafer and back wafer that are needed to provide a lens with the sphere power called for in a prescription. The optical technician must consult a component selection chart or table which identifies the particular wafers that are needed to provide the prescribed spherical correction.

Lens fabrication could be effected more quickly and efficiently and with less risk of error if reference to a selection chart or table was unnecessary.

The prior procedure does not provide any convenient procedure for cross checking or verifying, prior to lamination, that the correct pair of wafers have in fact been obtained from stock other than by again referring to the selection chart or table. It would be advantageous and less subject to mistake if this could be accomplished in a simpler, less time consuming manner.

The present invention is directed to overcoming one or more of the problems set forth above.

SUMMARY OF THE INVENTION

In one aspect, the present invention provides a method of fabricating a laminated lens to fill an ophthalmic prescription which includes the steps of selecting a back lens wafer from a stock of back lens wafers that have different sphere powers, selecting a front lens wafer from a stock of front lens wafers that have different base curves and laminating the selected wafers together to form the lens. The process is facilitated by arranging the stock of back lens wafers in order of the through sphere powers of the laminated lenses that can be produced by laminating the back lens wafers with front lens wafers that have similar base curves. Indicia are associated with each back lens wafer that identify a plurality of different through sphere powers that can be produced by combining the back lens wafer with different ones of the front lens wafers. The back lens wafer needed for a particular prescription is selected by scanning the indicia to locate a back lens wafer that provides the through sphere power specified in the prescription when it is combined with a front lens wafer having a specific one of the different base curves. A front lens wafer having that specific base curve is then selected for lamination with the selected back lens wafer.

In another aspect of the invention, the method includes the steps of providing each of the lens wafers with an individual package, displaying the through sphere power indicia on the exterior of the packages which contain back lens wafers and displaying base curve indicia on the packages which contain front lens wafers.

In a further aspect of the invention, the method includes the step of verifying compliance of the laminated lens with the prescription by providing each of the front lens wafer packages with a component that obscures the indicia on a package which contains a back lens wafer when the two packages are placed in a predetermined relationship except for the particular indicia that identify the sphere power of the lens that is produced by laminating the wafers that are contained in the two packages. The packages that contain a selected pair of wafers are placed in the predetermined relationship to verify that the lens will conform to the prescription.

In still another aspect, the invention provides a system for facilitating the fabrication of a laminated lens that conorms with an ophthalmic prescription and which is fabricated by selecting a back lens wafer from a plurality of such wafers that have differing sphere powers for lamination with a front lens wafer that is selected from a stock of front wafers that have differing base curves. The system include s a plurality of back lens wafer packages each of which contains an individual one of the stock of back lens wafers. Each back lens wafer package has indicia that identify the different through sphere powers of lenses that can be produced by laminating the back lens wafer with front lens wafers that have different base curves. The system further includes a plurality of front lens wafer packages each containing an individual one of the front lens wafers and each of which has indicia that identifies the base curve of the wafer in the package.

In a further aspect of the invention, each of the front lens wafer packages has means for obscuring the indicia on any selected one of the back lens wafer packages when the two packages are positioned in a predetermined relationship except for the indicia that identify the particular through sphere power of the lens that is produced by laminating the wafers contained in the two packages.

The invention enables direct selection of front and back lens wafers to meet the requirement of a ophthalmic prescription without reference to a component selection chart or table. The optical technician needs only the information on the prescription itself in order to locate the required back lens wafer and data associated with that wafer indicates which front lens wafer is to be selected. In the preferred form of the invention, selection of the correct pair of lens wafers can be quickly and easily verified by superimposing the two wafer packages as through sphere power indicia on the back lens wafer package are obscured except for the particular indicia that indicate the through sphere power of the lens that will be produced by lamination of the two lens wafers.

The invention, together with further aspects and advantages thereof, may be further understood by reference to the following description o preferred embodiments and by reference to the accompanying drawings.

DETAILED DESCRIPTION OF THE PREFERRED EMBODIMENTS

Figures 1, 2, 6:
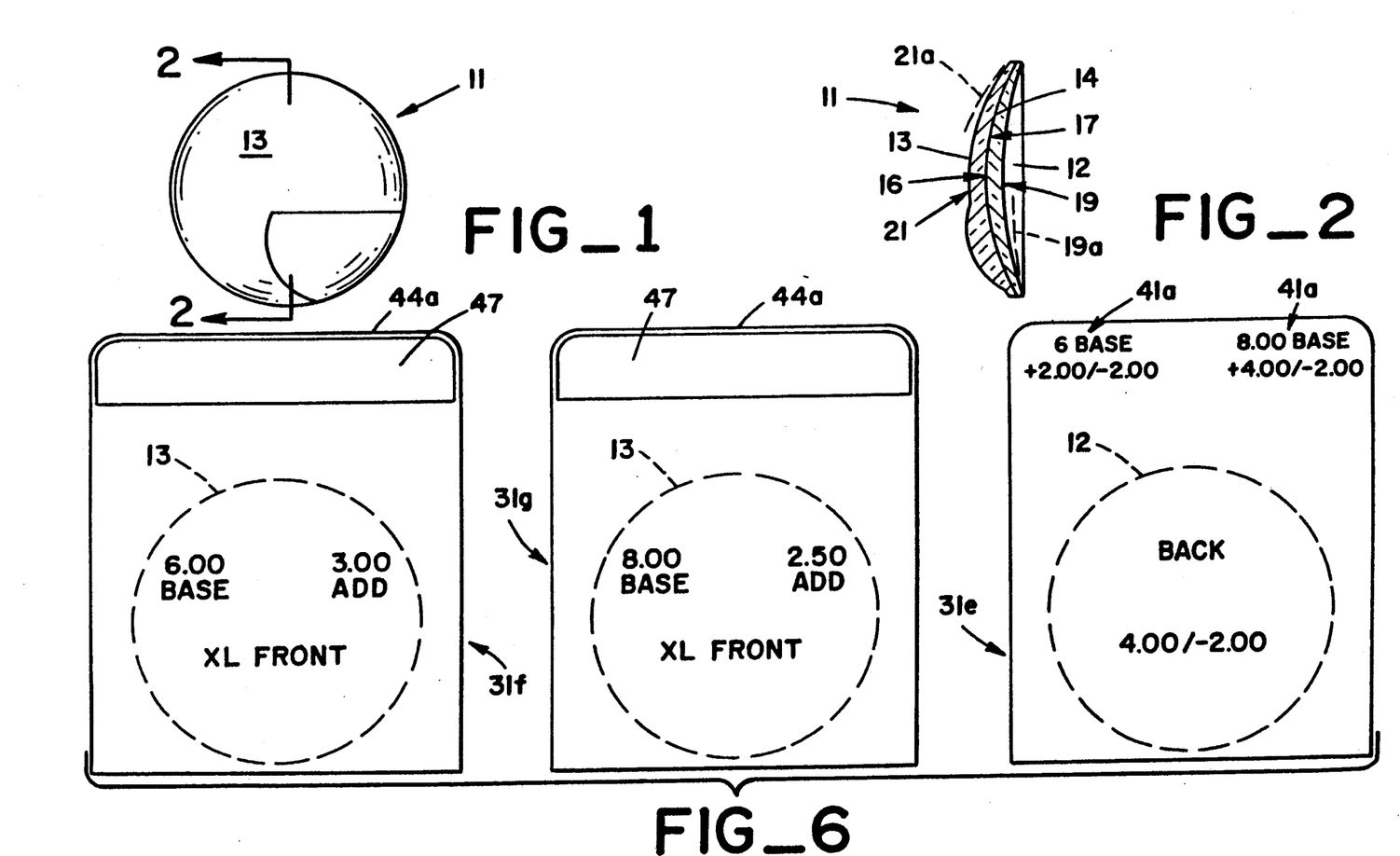
FIG. 1 is a broken out frontal view of a laminated lens as prepared in accordance with an ophthalmic prescription, the lens being shown as it appears prior to being trimmed to conform with a particular eyeglass frame.
FIG. 2 is a elevation section view of the laminated lens of FIG. 1.
FIG. 6 is an elevation view of another series of packages for containing lens wafers in accordance with another embodiment of the invention.

Referring initially to FIGS. 1 and 2 of the drawings in conjunction, certain characteristics of a laminated lens 11 will be briefly described to facilitate an understanding of the present invention.

Such a lens 11 is formed by joining a first or back lens wafer 12 and a second or front wafer 13 by means of a thin intermediate layer of light transmissive adhesive 14. The front surfaces 16 of all back wafers 12 in the stock and the rear surfaces 17 of all front wafers 13 have the same curvature. The wafer stock includes back wafers 12 having rear surfaces 19 of a number of different concave curvatures as indicated by dashed lines 19a to provide back wafers with incrementally differing sphere powers. The front wafers 13 in the stock have front or convex surfaces 21 which are also of different curvatures, as indicated by dashed lines 21a, for a similar purpose.

Figure 3:
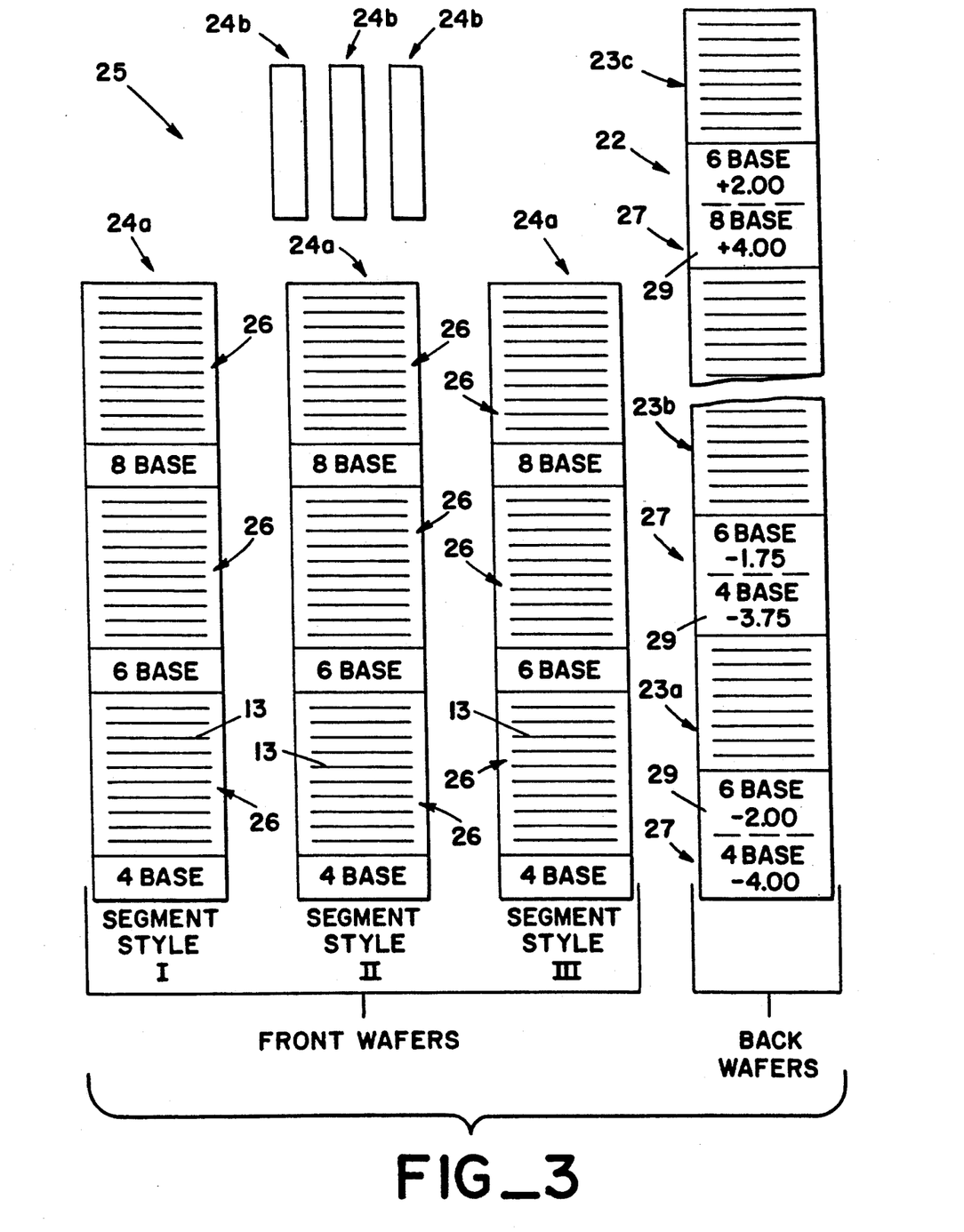
FIG. 3 is a diagrammatic depiction of a preferred arrangement of a stock of lens wafers which facilitates selection of the particular lens wafers that are needed to fill a particular ophthalmic prescription.

Referring to FIG. 3, the stock 22 of back wafers 12 which is maintained in the practice of the preferred embodiment of the present invention includes a series of such wafers having sphere powers that differ by a small increment which may be 0.25 diopters, for example, as standardized prescriptions specify variations of sphere power in similar increments. The stock of front wafers 13 includes a smaller number of different sphere powers that differ by a larger increment such as 2.00 diopter increments for example. A lens having any prescribed through sphere power within a range can be fabricated by laminating a selected one of the back wafers 12 and a selected one of the front wafers 13.

To conform the finished lens 11 with other parameters that are specified in ophthalmic prescriptions, the wafer stock 22 includes series, such as 23a, 23b, 23c, of back wafers 12 of each incremental sphere power which differ from each other by incremental degrees of cylinder correction. Plural groups 24a of front lens wafers 13 are also stocked which are similar to each other except that each of the groups 24a contains wafers of different segment style. In addition to containing wafers 13 which have different base curves, each such group 24a also includes series 26 of wafers that have the same base curve but which provide incrementally different degrees of add power. Groups 24a contain lens wafers which are configured in the known manner for the right eye. The front wafer stock 25 includes additional groups 24b of wafers that are configured for the left eye but are otherwise similar to groups 24a.

A wafer stock which includes 153 different back wafers 12 and 60 different front wafers 13 enables filling of any ophthalmic prescription calling for a through sphere power in the range from −4.00 to +4.00 diopters, a cylinder correction in the range from 0.25 to 2.00 diopters, an add power in the range from 0.75 to 3.00 diopters and any of three segment styles. For this purpose, the rear wafers stock 22 includes wafers 12 of 17 different sphere powers which range from nominal −2.25 diopters (nominal 8 back curve) to nominal +1.75 diopters (nominal 4 back curve) in 0.25 diopter increments and eight different wafers of each single sphere power are stocked to provide the range of cylinder corrections in 0.25 diopter increments. The front wafer stock 13 includes wafers having at least three different base curves which in the present example are 4 base, 6 base and 8 base and further includes ten different wafers of each base curve value to provide for ten different add powers. It should be recognized that these specific ranges of correction, numbers of wafers and other parameters set forth above are for purposes of example only. The invention is equally applicable to lens wafer stocks having different specific parameters. It should also be recognized that some laminated lenses may include more than the basic pair of lens wafers 12 and 13. As one example, an additional thin wafer may be added to reduce light intensity as in sunglasses.

To enable filling of an ophthalmic prescription without reference to a component selection chart or table, the back wafers 12 are arranged in order of the through sphere powers of the lenses that are produced by laminating the back lens wafers to front lens wafers 13 that all have the same base curve. This ordering is preferably based on lamination with the 6 base front lens wafer 13 in this particular example since all back wafers 12 are combinable with 6 base front wafers but are used with only one or the other of 4 base and 8 base front wafers. This ordering inherently causes the finished lens through sphere powers of the 4 base and 8 base combinations with the back wafers 13 to also be in consecutive order. The plural back wafers 13 of each single sphere power are arranged in order of degree of cylinder correction.

For simplicity of illustration, FIG. 3 depicts the wafer stock 22, 25 as Containing only a single one of each different wafer 12, 13. As a practical matter, a sizable inventory of each different wafer 12, 13 is stocked to enable repeated lens fabrications between restockings.

Visible indicia 27 are associated with each back lens wafer 12 that identify the through sphere powers of the finished lenses that result from laminating the particular back wafer with either of the two front wafer base curves that are compatible with the back wafer. Such indicia 27 may take various forms but are preferably a numeric display of the through sphere powers, in diopter units, that result from lamination of the back wafer 12 with front wafers 13 having the different base Curves that are usable with the back wafer. For example, the indicia 27 which identify the series of back lens wafers 12 that have a sphere power of +4.00 may carry indicia such as "6 base +2.00-8 base +4.00".

The indicia 27 may be displayed on partitions 29 which separate the back wafers 12 of different sphere power and may be displayed on individual wafer packages as will hereinafter be described, both forms of display being preferably provided.

The advantage of the above described ordering and through sphere powers display is that selection of the appropriate back lens wafer 12 for a lens prescription can be effected by simply scanning the back wafer stock 22 to locate the indicia 27 that correspond with the finished lens through sphere power specified in the prescription. The technician may then proceed through back wafers 12 at that location to obtain the one that provides the prescribed cylinder correction. As the indicia at that location identifies the base curve of the front wafer 13 that should be laminated to the selected back wafer 12, selection of the appropriate front wafer is equally simple. The front wafer 13 is selected from one of the groups 24a or 24b depending on whether the lens is for the right or left eye and depending on the segment style specified in the prescription. The technician withdraws a front wafer 13 Of the indicated base curve and having the add power called for in the prescription and the lamination process may then proceed.

Figure 4:
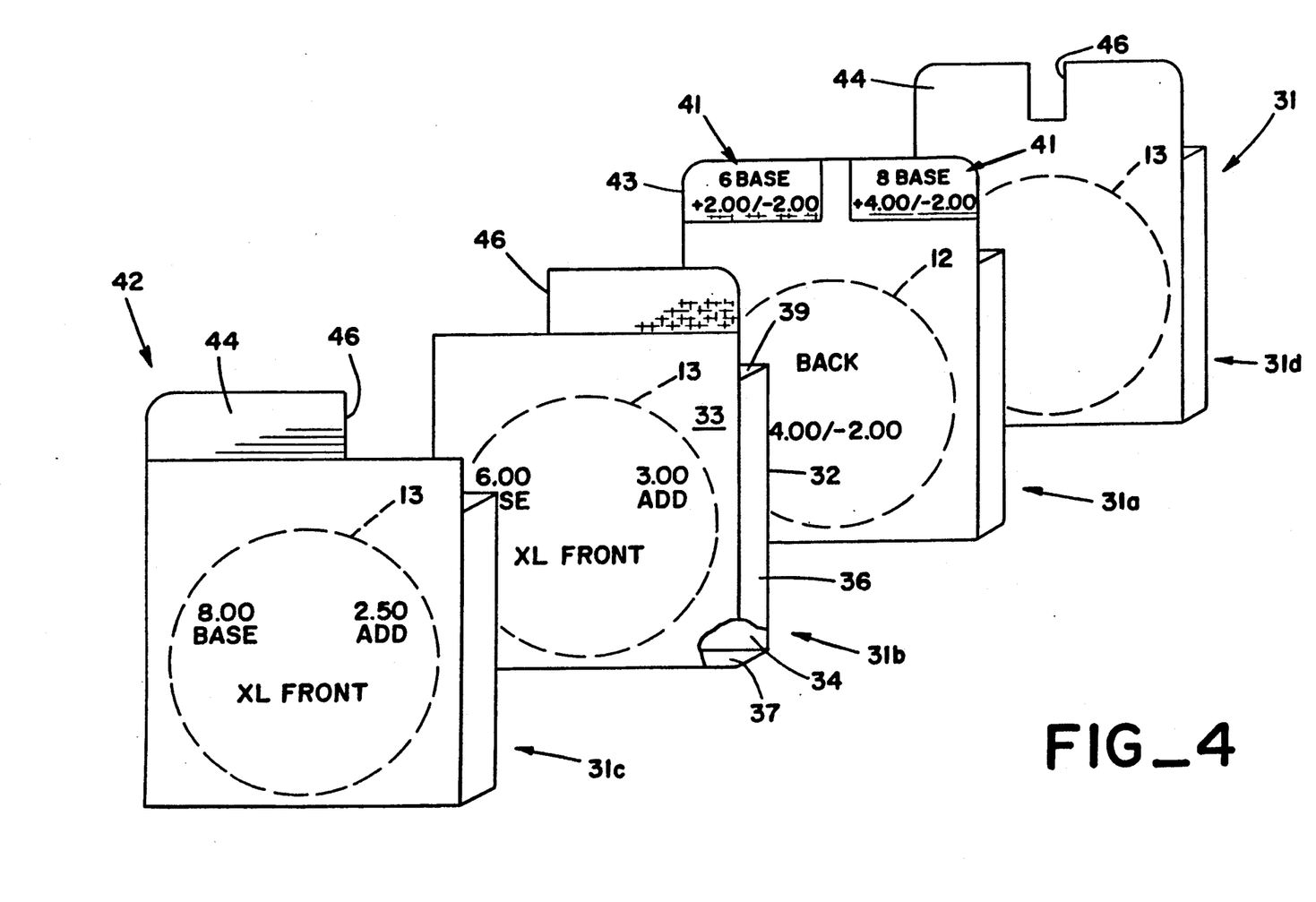
FIG. 4 is a perspective view of a series of lens wafer packages in accordance with a preferred embodiment of the invention.

Referring to FIG. 4, the lens wafers 12 and 13 are preferably provided with individual packages 31 prior to lamination in order to protect the wafers from damage. In the preferred form of the invention, the packages 31 have a construction that provides for verifying that the correct front wafer 13 and back wafer 12 have been selected and withdrawn from stock.

Packages 31 may be of any of various forms suitable for containing wafers, such as paper envelopes for example. The packages 31 of this particular example are cardboard or plastic boxes 32 of essentially rectangular shape and each of which has a front panel 33, back panel 34, side panels 36, bottom panel 37 and an openable top flap 39. The back lens wafer packages 31a may be imprinted with data which identifies the wafer as a back wafer and to indicate the sphere power of the wafer itself and the cylinder correction provided by the wafer although the previously described method does not require that this data be referred to in order to select an appropriate back wafer 12. The front wafer packages 31b, 31c, 31d are preferably imprinted with the base curve, add power and segment style of the wafer.

Each back lens wafer package 31a has visible indicia 41 that identify the two front lens wafer base curves that may be combined with the back wafer 12 of that package and which also identify the finished lens through sphere power that results from lamination to front lens wafers having those base curves. Indicia 41 also identify the cylinder correction provided by the rear wafer 12 in the particular package. The front wafer packages, such as 31b, 31c and 31d are provided with means 42 for obscuring the indicia 41 when a selected front wafer package and a selected back wafer package 31a are positioned in a predetermined relationship except for the particular indicia that identify the through sphere power and cylinder correction that result from laminating the wafers contained in the two packages.

In this embodiment, the indicia 41 are located on a tab 43 that extends upward from the rear wafer package 31a and which may be an upward extension of the front panel 33 or, alternately, the back panel 34 of the package. The indicia 41 for each of the two different front base curve combinations are located at opposite side regions of the front of the tab 43.

The front wafer packages 31b, 31c, 31d also have upwardly extending tabs 44 which may be similar to the tabs 43 except that the tabs 44 have cutout or open areas 46. The tabs 44 of the front wafer packages 31b, 31c, 31d cover the indicia 41 of a back wafer package 31a when the two packages are superimposed except for the particular indicia that identify the front wafer base curve, the through sphere power and the cylinder correction of the lens that is produced by laminating the lens wafers 12 and 13 that are Contained in the two packages.

Figures 5A, 5B:
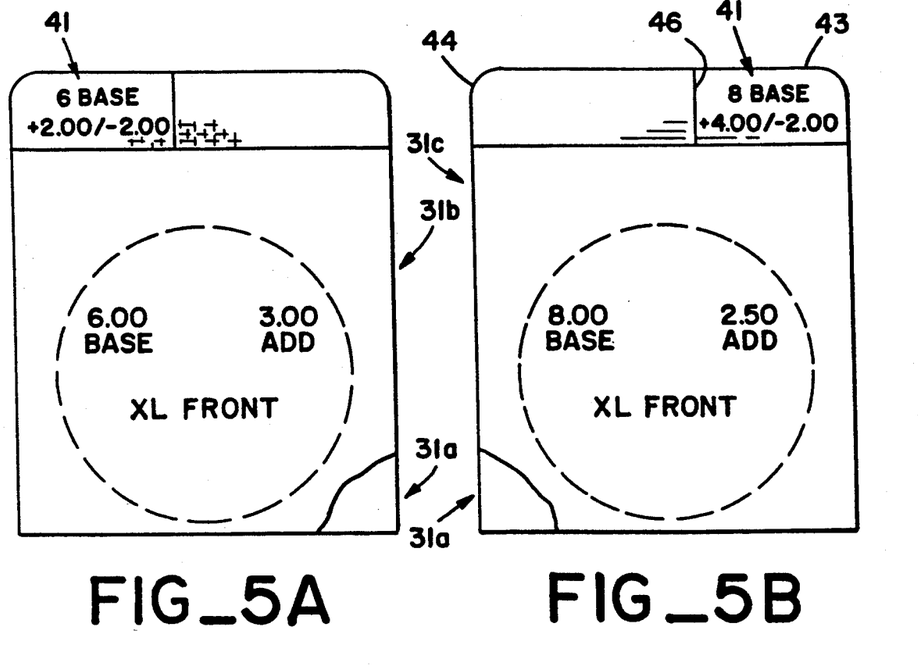
FIGS. 5A and 5B each depict overlaying of a different one of the packages of FIG. 4 on another specific one of the packages which operations enable verification of a correct lens wafer selection.

In the present specific example of the invention, the indicia 41 that indicate the finished lens through sphere power that results from laminating the back wafer 12 in the particular back wafer package 31a with a 6 base curve front lens 13 is situated at the left side region of the tabs 43. Thus the open areas 46 of front wafer packages 31c that contain 6 base wafers 13 are at the left side regions of the tabs 44 of those packages. Consequently, as shown in FIG. 5A, placing a front wafer package 31b which contains a 6 base wafer 13 in register with a selected back wafer package 31a obscures the indicia 41 except for the particular indicia that display the through sphere power and cylinder correction of the lens that will result from laminating the wafers that are contained in the two packages. Referring to FIG. 5B, indicia 41 which indicate the through sphere power and cylinder correction that results from laminating the back lens wafer 12 with an 8 base curve front lens 13 are located at the right side region of tab 43. The open area 46 of packages 31c that contain 8 base curve front wafers 13 are at the right one third of the tabs 44 of such packages. Thus registration of a front wafer package 31c of that kind with a back wafer package 12 again obscures the indicia 41 except for the indicia that designates the front wafer base curve, the through sphere power and the cylinder correction of a lens produced by laminating the wafers in the two packages.

Referring again to FIG. 4, it is possible to extend the range of available finished lens through sphere powers by stocking additional front lens wafers 13 that have a fourth base curve and in such a system some of the rear wafers 12 are usable with front wafers 13 of any of three different base curve values. The indicia 41 for the third possible base curve Combination may be situated at the center regions of the tabs 43 of the rear wafer packages 31a. The open areas 46 of packages 31d that contain front wafers having the additional base curve are at the central region of such packages. Thus overlaying such a front wafer package 31d on a back wafer package 31a again exposes only the particular indicia 41 that identify properties of the lens that results from laminating the wafers of the two packages.

The portions of the tabs 43 of the back wafer packages 31a at which the indicia 41 identify the different front wafer base curves are preferably differently colored. The tabs 44 of the front wafer packages 31b, 31c, 31d have a color which is similar to that of the region of the particular base curve indicia 41 that identifies the base curve of the front wafer that is contained in the particular front wafer package. Thus when a selected front wafer package 31b, 31c, 31d is superimposed on a selected back wafer package 31a, a continuous band of uniform color is visible across the top of the packages and is itself indicative of the base curve. This association of different colors with the different base curves lends emphasis and expedites the wafer selection process.

Thus, prior to lamination of a selected pair of wafers, conformity of the laminated lens that will be produced with the ophthalmic prescription can be verified by overlaying the front wafer package 31b, 31c or 31d and the back wafer package 31a. The through sphere power, cylinder correction, add power and segment style of the lens are each displayed and can be compared with the corresponding data in the prescription.

The open areas 46 of the front wafer packages such as 31a, 31b, 31c can be reduced in size and be of greater number in other systems where one or more of the back wafers may be combinable with more than three different front lens wafer base curves. The tabs 43 and 44 may also be situated at other locations on the packages 31 and ca be located to provide the above described obscuring of all but the significant indicia 41 when placed in a predetermined relationship with each other that differs from the registering of the two packages as described above.

The indicia obscuring means 42 may take forms other than the tabs 44 with open areas 46. Referring to FIG. 6, for example the indicia 41a on the back wafer packages 31e that identify the different base curves that may be combined with the back wafer 12 together with the resulting through sphere power and cylinder correction may each have a different coloration. The front wafer packages 31f, 31g of this embodiment have a modified form of tab 44a which includes a window 47 that extends across the tab and which is formed of color filtering material. The color filtering windows 47 of front wafer packages 31f, 31g that contain wafers 13 of different base curves transmit different colors that correspond to the color of the particular indicia 41a that identify the base curve of the wafer 13 contained in the front wafer package and do not transmit the color or colors of the other indicia 41a.

Figures 7A, 7B:
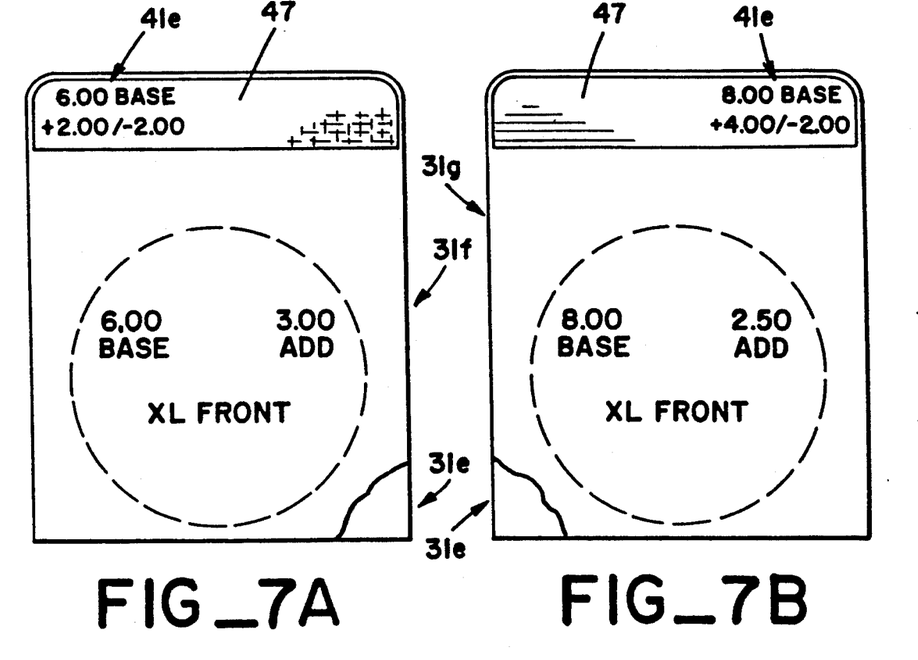
FIGS. 7A and 7B each depict overlaying of a different one of the packages of FIG. 6 on another specific one of the packages.

Thus correct selection of a pair of wafers 12 and 13 can be verified prior to lamination in essentially the manner previously described. Referring to FIG. 7A, overlaying the selected back wafer package 31e with the selected front wafer package 31f prevents viewing of the indicia 41e except for the particular indicia that identify the base curve of the selected front lens wafer, the through sphere power that will result from lamination of the two lens wafers and the cylinder correction that will be provided. Referring to FIG. 7B, overlaying of the same back wafer package 31e with the other front wafer package 31g suppresses viewing of that particular indicia 41e while enabling viewing of other particular indicia that identify the different lens properties that will result from lamination of the wafers in the two packages.

While the invention has been described with reference to certain particular embodiments for purposes of example, many variations and modifications are possible and it is not intended to limit the invention except as defined in the following claims.

We claim:

1. In a method of fabricating a laminated lens to fill an ophthalmic prescription which includes the steps of selecting a back lens wafer from a stock of back lens wafers that have different sphere powers, selecting a front lens wafer from a stock of front lens wafers that have different base curves, and laminating the selected wafers together to form said lens, the improvement comprising:
 arranging said back lens wafers of said stock thereof in order of the through sphere powers of the laminated lenses that can be produced by laminating the back lens wafers with front lens wafers that have the same base curve,
 associating indicia with each of said back lens wafers that identifies at least two different front lens wafer base curves and which further identifies at least two different laminated lens through sphere powers that can be produced by combining the particular back lens wafer with different ones of said front lens wafers that have differing ones of said base curves,
 selecting said back lens wafer for said lens by scanning said indicia to find a back lens wafer having indicia associated therewith which indicates that the back lens wafer provides a lens having the through sphere power that is specified in said prescription when the back lens wafer is combined with a front lens wafer having a specific one of the different base curves, and
 selecting one of said front lens wafers that has said specific base curve for lamination with the selected back lens wafer.

2. The method of claim 1 including the further steps of stocking a plurality of said back lens wafers of each of said sphere powers wherein said pluralities of back lens wafers of like sphere power include wafers having a plurality of different cylinder corrections, arranging the back lens wafers of like sphere power in order of cylinder correction, and providing indicia at each back lens wafer that identifies said cylinder correction thereof in conjunction with said identification of said plurality of different through sphere powers.

3. The method of claim 2 including the further steps of stocking groups of said front lens wafers wherein the front lens wafers of each group have the same base curve and provide a sequence of different add powers, providing indicia at each front lens wafer that identifies said add power thereof in conjunction with said base curve thereof, arranging said groups of front lens wafers in order of said base curves thereof and arranging the wafers of each of said groups in order of said add powers thereof.

4. The method of claim 3 including the further step of maintaining a plurality of said groups of front lens wafers wherein the wafers of each plurality have the same segment style and the wafers of different ones of the pluralities have different segment styles.

5. The method of claim 1 including the further steps of providing each of said wafers with an individual package, displaying said through sphere power indicia on the exterior of the packages which contain said back lens wafers and displaying base curve indicia on the exterior of packages which contain said front lens wafers.

6. The method of claim 5 including the further step of verifying compliance of said laminated lens with said prescription by providing each of the front lens wafer packages with a component that obscures said indicia on a package which contains a back lens wafer when the front lens wafer package is placed in a predetermined relationship with the back lens package except for the indicia which identifies the sphere power of the lens which is produced by laminating the wafers that are contained in the two packages, and placing the packages that contain said selected back lens wafer and said selected front lens wafer in said predetermined relationship prior to said lamination of said lens wafer to verify that the wafers will produce a lens conforming with said prescription.

7. In a system for facilitating the fabrication of a laminated lens that conforms with an ophthalmic prescription and which is fabricated by selecting a back lens wafer from a plurality of back lens wafers of differing sphere power for lamination with a front lens wafer that is selected from a plurality of front lens wafers of differing base curve, the improvement comprising:

a plurality of back lens wafer packages each of which contains an individual one of said back lens wafers, each of said back lens wafer packages having indicia thereon that identify at least two different front lens wafer base curves and which further identify at least two different laminated lens through sphere power of lenses that can be produced by laminating the particular back lens wafer that is contained in the package with front lens wafer of the differing base curves that are identified by said indicia on the back lens wafer package, and a plurality of front lens wafer packages each of which contains an individual one of said different front lens wafers and each of which is indicia thereon that identifies the base curve of the front lens wafer that is contained in the package.

8. The system of claim 7 wherein each of said front lens wafer packages has means for obscuring said indicia on any selected one of said back lens wafer packages when the selected back lens wafer package is positioned in a predetermined relationship with the front lens wafer package except for the indicia that identify the particular through sphere power of the lens that is produced by laminating the wafers contained in the two packages.

9. The system of claim S wherein each of said front lens wafer packages has an opaque region which overlays said indicia except for the indicia that identify said particular through sphere power when the front lens wafer package is placed in said predetermined relationship with said selected one of said back lens wafer packages.

10. The system of claim 9 wherein said front and back lens wafer packages have similar outlines except along one edge of the packages and wherein said indicia are situated at spaced apart locations along said one edge of said back lens wafer packages and wherein said opaque region of each of said front lens wafer packages is defined by at least one tab which extends along at least one portion of said one edge of the front lens wafer package in position to cover said indicia except for said particular indicia when the front and back lens wafer packages are placed in register with each other.

11. The system of claim 8 wherein each of said front and rear lens wafer packages has conforming rectangular front and back panels which are joined together to form a receptacle for retaining one of said lens wafers, one of said panels of said rear lens wafer packages being of greater height than the other thereof and having said indicia at the upper edge region of said one panel, and wherein only portions of one of said panels of said front lens wafer packages are of greater height than the other panel thereof, said portions being located to cover said indicia except for said particular indicia when one of said front lens wafer packages overlays said selected one of said back lens wafer packages.

12. The system of claim 8 wherein the regions on each of said back lens wafer packages at which said indicia are located each have a different coloration and wherein said opaque regions of said front lens wafer packages that contain said different particular ones of said front lens wafers each have a different coloration, the coloration of said opaque region of each of the front lens wafer packages being similar to the coloration of said region of said back lens wafer packages at which said indicia indicative of said particular through sphere power are located.

13. Tho system of claim 8 wherein the indicia on said back lens wafer package that identify different through sphere powers are of different colors and wherein each of said front lens wafer packages has a window which overlays said indicia of said selected one of said back lens wafer packages when the back lens wafer package is positioned in said predetermined relationship therewith which window is formed of a color filtering material that suppresses viewing of said different colors except for the color of said indicia that identifies said particular through sphere power that is produced by laminating the wafers that are contained in the two packages.

14. The system of claim 7 wherein said plurality of back lens wafer packages are arranged in order of the through sphere powers that result from lamination of the wafer in each package with front lens wafers that have the same base curve.

15. The system of claim 14 wherein said plurality of back lens wafers includes series of lens wafers of the same sphere power but different degrees of cylinder correction which wafers are disposed in individual ones of said packages and arranged together in order of the degree of cylinder correction that is provided by each lens wafer and wherein said indicia on each back lens wafer package identify said degree of cylinder correction in conjunction with said through sphere powers.

16. The system of claim 15 wherein said plurality of front lens wafers include wafers of similar base curve but different segment style and of similar segment style but with different degrees of add power and each of which is disposed in a separate one of said front lens wafer packages, the ones of said second lens wafer packages that contain wafers of similar segment style being grouped together and being arranged in sub-groups that include the packages which contain wafers having the same base curve, the packages of each of said sub-groups being arranged in order of the add powers of the wafers that are contained in the packages.

* * * * *